United States Patent [19]

Brown

[11] Patent Number: 4,928,981
[45] Date of Patent: May 29, 1990

[54] JAW LOCKING MEANS FOR CHUCKS

[75] Inventor: Lawrence H. Brown, Ambler, Pa.

[73] Assignee: Accu-Ring Jaw Systems, Inc., Ambler, Pa.

[21] Appl. No.: 308,559

[22] Filed: Feb. 10, 1989

[51] Int. Cl.⁵ .............................................. B23B 31/10
[52] U.S. Cl. .................................. 279/1 SJ; 279/123
[58] Field of Search .................... 279/1 SJ, 1 R, 1 L, 279/1 ME, 123

[56] References Cited

U.S. PATENT DOCUMENTS

| | | | |
|---|---|---|---|
| 2,925,282 | 2/1960 | Borsetti | 279/1 SJ |
| 3,945,654 | 3/1976 | McMullen | 279/1 SJ X |
| 4,041,612 | 8/1977 | Skubic | 279/1 SJ X |
| 4,696,482 | 9/1987 | Brown | 279/1 SJ |
| 4,772,034 | 9/1988 | Brown | 279/1 SJ |

Primary Examiner—Steven C. Bishop
Attorney, Agent, or Firm—Joseph W. Molasky

[57] ABSTRACT

A lock ring device for locking the soft jaws of a lathe chuck or the like at a desired position for the machining of the work engaging surfaces of the soft jaws, the device being adjustable to position the jaws in the locking position for the exact amount of metal removal desired. The device is designed for use with the standard soft jaws in use today.

12 Claims, 6 Drawing Sheets

JAW LOCKING MEANS FOR CHUCKS

BACKGROUND OF THE INVENTION

1. Field of the Invention

This invention relates to means for locking or positioning the soft jaws of a chuck, such as a lathe chuck or the like, during the procedure for machining the jaws to fit the workpiece to be held by the jaws of the chuck.

2. Description of the Prior Art

There is disclosed in U.S. Pat. Nos. 4,696,422 and 4,772,034, issued to applicant, a jaw locking device of the indicated type which is designed to lock the soft jaws for the purpose of machining the jaws to fit the workpiece at full chuck pressure and that provides for adjustment of the jaws in the locking position for the exact amount of metal removal desired. More specifically, the locking devices disclosed in said patents are capable of making accurate adjustments for the purpose of machining the exact amount of metal from the jaws so that the jaws fit the workpiece to be held thereby within a tolerance of plus or minus 0.0005 inches, and are designed to stop the jaws within the movement of the chuck attaining the maximum jaw pressure that can be delivered by the chuck. Also, said device is designed to provide means for the operator to know how much metal he is going to remove during the jaw machining operation and to be able to stop the jaws in measured thousandths of an inch.

SUMMARY OF THE INVENTION

It is the general object of the invention to provide a jaw locking or positioning means of the type described in said prior mentioned patents which can be used with standard soft jaws and which can be used where the swing of the lathe requires a small diameter ring.

Briefly stated, the jaw locking or positioning means in accordance with the invention comprises a ring means adapted to be arranged with portions in the proximity of the soft jaws and having radially extending holes, a plurality of studs, one of which is associated with each of the soft jaws, and means for securing each of the studs to an associated soft jaw with each stud extending through a radial hole in said ring means to provide a threaded portion projecting radially outwardly from the outer surface of the ring means and with each stud extending on an axis parallel to and spaced apart from the axis of radial movement of the associated soft jaw. The device in accordance with the invention also comprises a plurality of nut means threadedly engaged on each of the studs at an outwardly projecting portion and being adjustable radially along the threaded portion of the studs to a position to limit the radial inward movement of said soft jaws to lock said soft jaws at a desired position for the machining of said workpiece engaging surfaces of said soft jaws. More specifically, the means for securing each stud to an associated soft jaw comprises a bolt means having an elongated portion adapted to be received in and extend outwardly from a counterbore in an associated soft jaw and a threaded portion adapted to be threadedly engaged with a hard jaw for securing said soft jaw to said hard jaw for conjoint movement thereof, the associated stud being engagable with said extended portion of said bolt means at a location outwardly of said soft jaw.

The design in accordance with the invention permits the ring to be no larger than the body of the chuck and permits the use of the jaw locking means with a standard soft jaw which is provided with a counterbore designed for use in securing the soft jaw to a hard jaw for conjoint movement therewith. The design is such that the ring can fit on any soft jaw without drilling and tapping an additional threaded hole in the soft jaw as was the case with the design of said prior patents. Further, by reason of the design whereby the ring is positioned out in front of the soft jaws, the same size ring can be used for chucks of many sizes, such as up to 24 to 30 inches.

DETAILED DESCRIPTION OF THE PREFERRED EMBODIMENT

Figure 1:
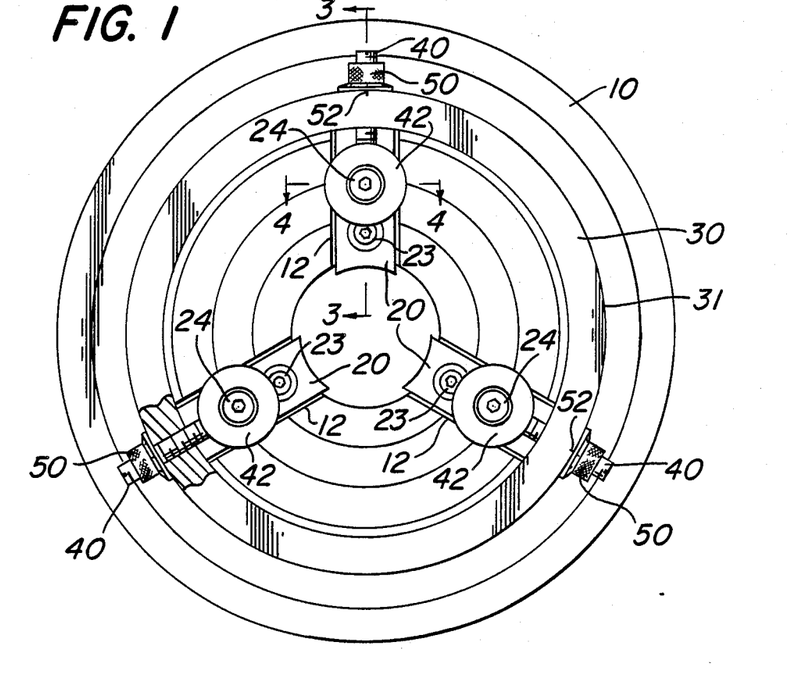
FIG. 1 is a front elevational view showing the jaw locking means of the invention in engagement with the soft jaws of a three-jaw lathe chuck.

Referring to FIG. 1, there is shown a three-jaw lathe chuck having a chuck body 10 formed of a one-piece steel casting and provided with means, such as a tapered recess in its rear face, for mounting the chuck on the spindle (not shown) of the lathe. The chuck body 10 and the operating components thereof for effecting simultaneous gripping action by the three chuck jaws (i.e., the jaw setting means) are of an entirely conventional construction and for this reason will be described only briefly herein. The construction and operation of said jaw setting means and the hard jaws 12 is well understood by those skilled in the art and for a further description thereof reference is made to said prior-mentioned patents.

The three soft jaws 20 (also known in the art as top jaws) are constructed to be securely bolted on top of associated hard jaws 12 (also known in the art as master jaws) by means of a pair of bolts, each soft jaw 20 mating with its associated hard jaw 12 at a serrated bottom portion 21. In accordance with conventional design, shoulder bolts (such as bolt 23 shown in FIG. 3) are received in counterbored holes 22 in the soft jaws 20 and extend therefrom to threadedly engage the hard jaws 12 associated therewith. This structure is generally conventional and is provided on most existing lathe chucks. By means of the jaw locking means as described in said prior-mentioned patents, the soft jaws 20 are locked for the purpose of machining the same to fit the workpiece to be held at full chuck pressure.

Figures 2, 4, 4A:
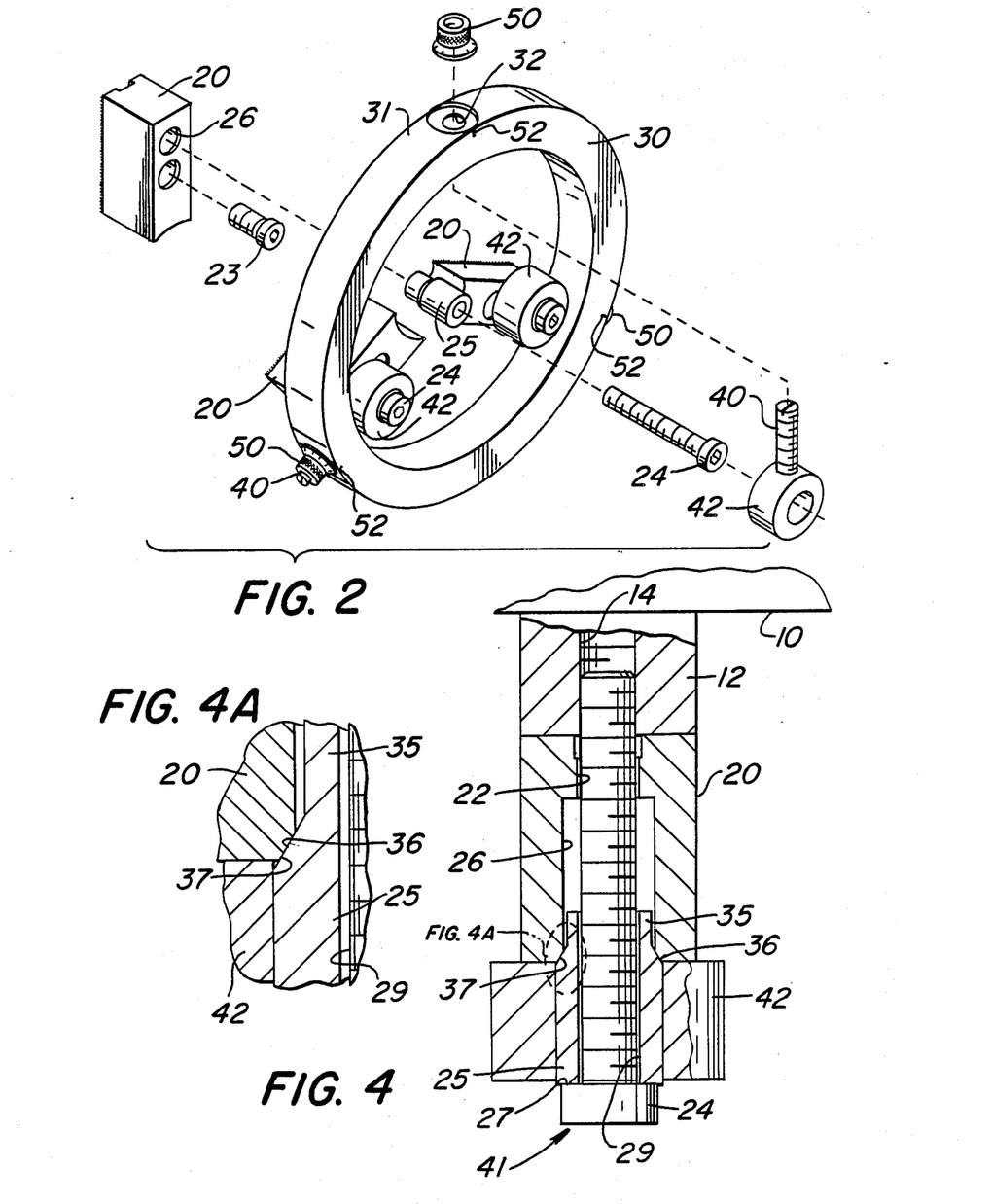
FIG. 2 is a perspective view showing the jaw locking means in accordance with the invention.
FIG. 4 is a fragmentary sectional view taken on line 4—4 of FIG. 1.
FIG. 4A is a detail of the circled area of FIG. 4.

The jaw locking or positioning means shown in FIGS. 1-5 comprises a ring 30 made of a material of sufficient size and strength to hold the jaw tension of a power hydraulic chuck, or any other chuck with which it is to be used. As described in said prior mentioned patents, typically, the ring 30 may be made of a 1020 steel. As shown in FIGS. 1 and 2, ring 30 is adapted to be arranged with portions in the proximity of the soft jaws 20 and has a diameter which is no larger than the body 10 of the chuck itself. Ring 30 is provided with three radially extending holes 32 spaced apart equally (120° apart) circumferentially around ring 30. In the mounted condition of the jaw locking means with ring 30 in front of the soft jaws 20 as shown in FIG. 1, and as will be described hereafter, the holes 32 are aligned with axes which are parallel to and spaced apart (i.e., outwardly) from the corresponding axes of radial movement of each associated soft jaw 20.

The jaw locking means comprises three studs 40, one stud 40 being associated with each soft jaw 20. The studs 40 are externally threaded throughout their entire length and each is adapted to extend through a radial hole 32 in ring 30, the holes 32 being drilled of a size to provide clearance for the threaded studs 40 to pass therethrough. Studs 40 are all the same length.

In accordance with a novel feature of the present invention there is provided novel means for securing each of the studs 40 to an associated soft jaw 20 with each stud extending through a radial hole 32 in the ring 30 to provide a threaded portion projecting radially outwardly from the outer surface of the ring 30 and with each stud 40 extending on an axis parallel to and spaced apart (outwardly) from the axis of radial movement of an associated soft jaw 20. Such securing means comprises a bolt means, indicated generally at 41, having an elongated first portion adapted to be received in and to extend outwardly from a counterbore in an associated soft jaw 20 and a threaded portion adapted to be threadedly engaged with a hard jaw 12 for securing the soft jaw 20 to the hard jaw 12 for conjoint movement thereof. The securing means also comprises an annular collar 42 having a threaded bore 46 therein.

The bolt means 41 is comprised of a long bolt 24 in the form of an Allen-head cap screw and a sleeve 25 adapted to have the shaft of the bolt 24 extend through its central hole 29. The outer diameter of sleeve 24 is such that it fits, with a sliding fit, within the central hole 44 of the annular collar 42. Sleeve 25 has a reduced diameter portion 35 which is adapted to extend within the counterbore 26 in the soft jaw 20 and which is joined with the large diameter portion of sleeve 25 by a conical tapered portion 36.

Figure 3:
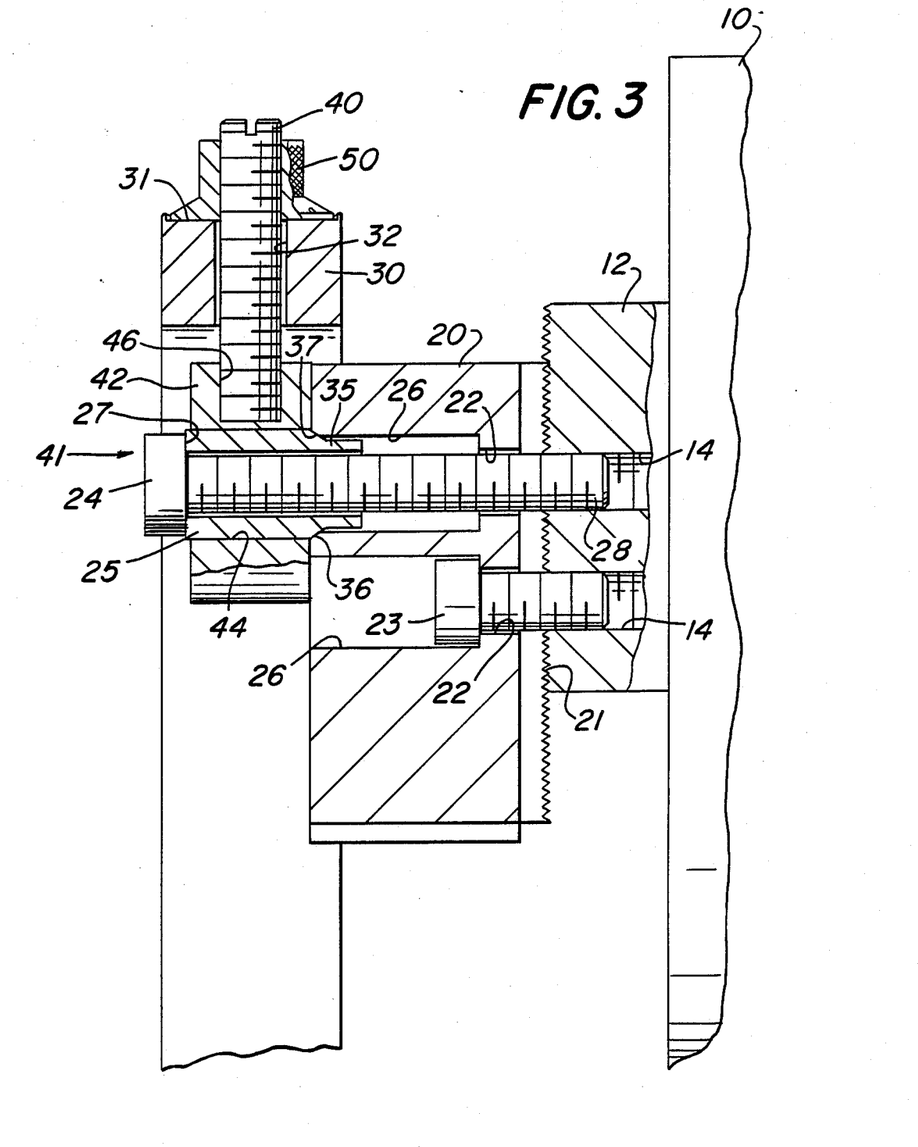
FIG. 3 is a fragmentary sectional view taken on line 3—3 of FIG. 1.

Each stud 40 is secured to an associated soft jaw 20 by assembling the parts in an arrangement as is best shown in FIG. 3. To this end, the bolt means 41 is secured with sleeve 25 having its reduced diameter portion 35 extending into the counterbore 26 of the soft jaw 20 with the tapered portion 36 in solid mating contact with the chamfered outer end 37 of the counterbore 26. Also, the shaft of bolt 24 is extended through the central hole 29 of sleeve 25 and through the outer counterbore 26 and hole 22 in the bottom end of soft jaw 20 for the threaded engagement of the threaded end 28 of bolt 24 with the hard jaw 12 at the outer threaded bore 14 thereof in a position, as is shown in FIG. 3, with the head of the bolt 24 tightened against the outer end of sleeve 25 to hold the tapered portion 36 in bearing contact with soft jaw 20 at the outer end 37 of counterbore 26. In this assembled condition of the parts, the sleeve 25 functions to, in effect, extend the shoulder 27 of the head of the bolt 24 from the inner surface of the bolthead axially inwardly to make bearing contact with the soft jaw 20 at the outer end 37 of counterbore 26. Also, by reason of the tapered portion 36 being arranged to come into contact with the chamfered outer end 37 of counterbore 26, the sleeve 25 functions as a centering device to automatically center the bolt 24 in the counterbore 26. In other words, the tapered portion 36 provides a centering seat for the assembly and thereby serves to accommodate the bolt means 41 to the different sizes and tolerances that exist with different soft jaws in use today. The solid contact provided at the mating surfaces of tapered portion 36 and chamfered outer end 37 produces excellent rigidity and strength to the construction, the taper angle being, typically, about 20-30 degrees, and the depth being 3/16-¼ inches, as best shown in FIG. 4A.

After each of the three bolt means 41 has been mounted to secure a soft jaw 20 and hard jaw 12 together as shown in FIG. 3, an assembly comprising the ring 30 with the three studs 40 engaged in their associated collars 42 mounted thereon is maneuvered to be mounted on the outer walls of the three sleeves 25. The studs 40 are mounted on the ring 30 by means of micrometer-type nuts 50 being threaded on the outer end thereof and with the inner end of each stud 40 threadedly engaged in the threaded bore 46 in the collar 42 associated therewith to a set position, preferably being bottomed out in said bores 46. During this assembly procedure, each collar 42 is mounted to be positioned with its inner face adjacent a soft jaw 20 and with sleeve 25 received in the central opening 44 in collar 42. In this assembled condition of the jaw locking means, the studs 40 extend on an axis parallel to and spaced apart from the axis of radial movement of their associated soft jaws 20 and provide a threaded portion projecting radially outwardly from the outer surface 30 of the ring 30, as is apparent from a consideration of FIGS. 1 and 3.

The jaw locking means also comprises three nuts 50, each nut 50 having a knurled surface and being adapted to be threadedly engaged on one of the studs 40 at an outwardly projecting threaded portion thereof. The nuts 50 are adjustable along the length of the studs 40 to position, or limit the radial movement of, the soft jaws 20 so as to locate said soft jaws 20 at a desired position for the machining of the workpiece engaging surfaces of said soft jaws 20 as will be described hereafter.

Figure 5:
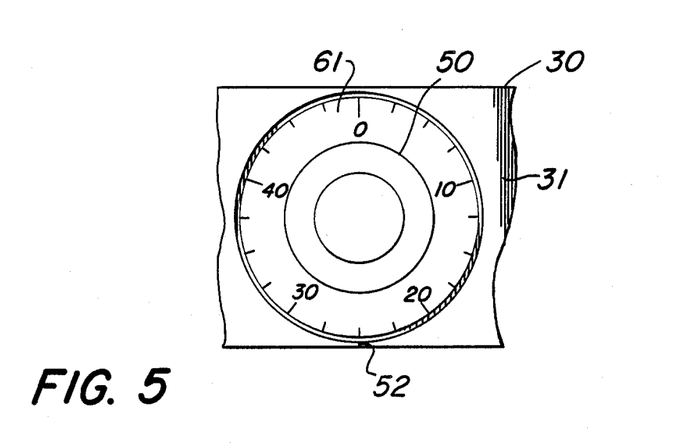
FIG. 5 is a fragmentary view of a detail.

There are also provided three annular disks 60 having a circular scale formed on the outer surface thereof, each nut 50 being provided with a disk 60 as a unitary part formed on the inner end thereof as shown in the Drawings. The circular scale in each disk 60 is provided by twenty circumferentially equally spaced marks with the numbers 0, 10, 20, 30 and 40 adjacent appropriate marks as shown in FIG. 5. Also, the outer surface of ring 30 is provided with a reference mark 52, adjacent the scale on each disk 60 to allow the operator to determine the amount of rotation of a nut 50 from an initial position thereof for a purpose to be described more fully hereafter and which is described in detail in said prior patents.

As described in said patents, in the preferred design the studs 40 are one half inch in diameter and are threaded to provide 20 threads per inch. This provides for adjustment of the nuts 50 to be 0.050 inches for one complete turn of a nut and 0.0025 inches for rotation through one of the twenty increments provided by the marks on the scale or disk 60. The holes 32 and ring 30 are drilled one thirty-second of an inch oversize to provide the clearance necessary for insertion of the studs 40 therethrough.

OPERATION

In the use of the jaw locking means in accordance with the invention, the three soft jaws 20 are bolted to their associated hard jaws 12 of the chuck means by means of a bolt 23 and one of the bolt means 41, which includes a bolt 24 and an associated sleeve 25. The condition of the parts with the soft jaws 20 assembled onto the hard jaws 12 is best illustrated by reference to FIGS. 3 and 4. The jaw locking means is assembled in a condition with the three studs 40 extending through associated holes 32 and threaded into the threaded bores 46 in the collars 42 associated therewith to a set position, the studs 40 being held in position by the nuts 50 which are mounted on the outer ends thereof. The assembled jaw locking means is then positioned onto the outer ends of the bolt means 41 by orienting and then sliding each of the annular collars 42 onto the outer surface of the sleeves 25 to a position as best shown in FIGS. 1 and 3. The nuts 50 are adjusted an appropriate amount to position the ring 30 to be concentric with the axis of the chuck.

The next step is to place the workpiece to be held by the soft jaws 20 within the inner ends thereof and to close the chuck at full pressure and to center the ring 30 as concentric as possible relative to the central axis of the chuck. In this step, the nuts 50 and disks 60 are run down onto the outer ends of the studs to the outer surface of the ring 30 and the nuts 50 and disks 60 are finger tightened onto the outer surface 31 of the ring when the concentric position is achieved.

The next step is for the operator to calculate the amount of metal removal required and after this determination, the operator opens the chuck, removes the workpiece and then backs off the nuts 50 on the three studs 40 to the exact number of thousandths to achieve the amount of metal removal desired. This adjustment step is described in detail in the prior-mentioned patents. After the nuts 50 have been adjusted, the chuck is closed at full pressure and the nuts 50 will lock the soft jaws 20 exactly where they should be to bore out the surface thereof to fit the workpiece accurately. It will be apparent that nuts 50 "lock" the soft jaws in the desired position by engaging ring 30 at the outer surface 31 thereof to limit the radial movement of each stud 40 and the soft jaw 20 secured thereto.

The final step in the operation is to bore out the soft jaws 20 to fit the workpiece in accordance with well known procedures.

In FIGS. 6-9 there is shown another embodiment of the invention wherein the ring of the jaw locking means is made of a smaller diameter so as to be radially inwardly of the means for securing the studs to the soft jaws. This form of the invention is for use in applications where it is desired to keep the jaw locking device within the outer dimensions of the jaws. This embodiment of the invention comprises essentially the same parts as those of the embodiment shown in FIGS. 1-5 with some parts being modified slightly in their dimensions. Accordingly, corresponding parts have been given the same reference numerals and corresponding parts that have been modified have been given the same reference numerals with primes added.

Figure 6:
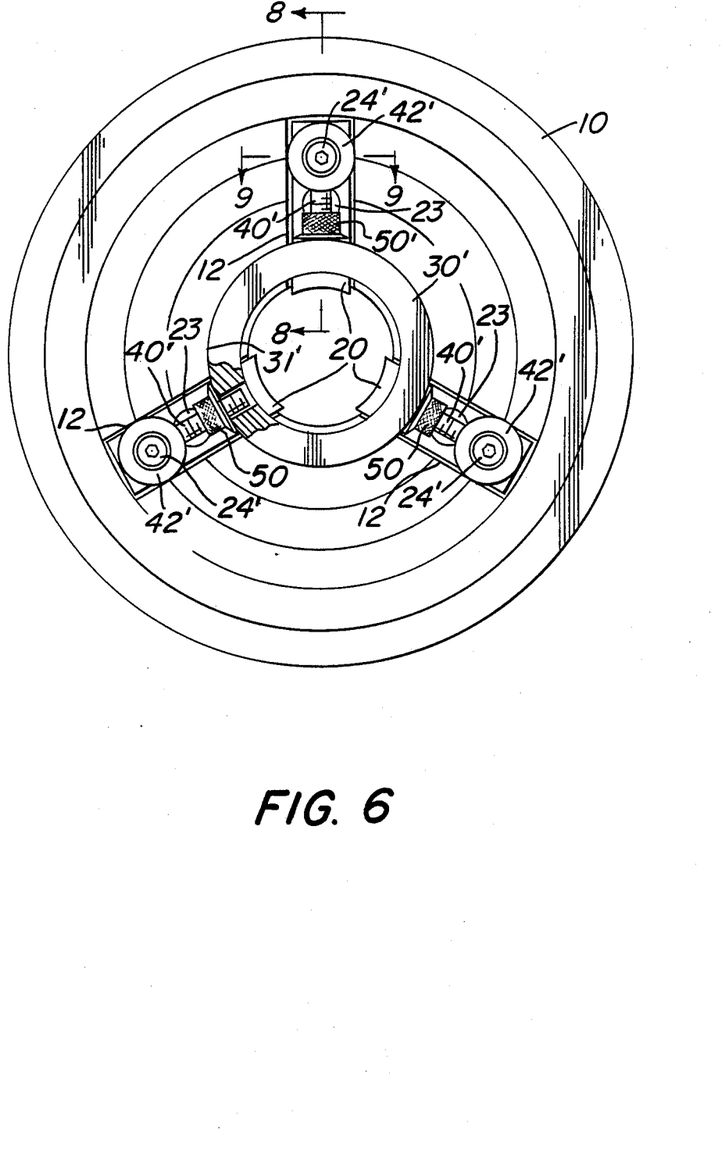
FIG. 6 is a front elevational view of a second embodiment of the invention.

In FIG. 6 there is shown a three-jaw chuck having a chuck body 10 and three hard jaws 12. There are three soft jaws 20 constructed to be securely bolted on top of associated hard jaws 12.

There is also provided a jaw locking means comprising a ring 30' constructed the same as ring 30 except that it has a smaller diameter. Ring 30' is adapted to be arranged with portions in the proximity of the soft jaws 20 which are radially inwardly of the means for securing the studs to an associated soft jaw as will appear hereafter. Ring 30' is provided with three radially extending holes 32' spaced 120° apart around ring 30', the holes 32' being aligned with axes which are parallel to and spaced apart from the corresponding axes of radial movement of each associated soft jaw 20.

The jaw locking means comprises three studs 40' which are the same as the studs 40 except that studs 40' are slightly shorter in length. These studs 40' are adapted to extend within the radial holes 32'.

The means for securing each of the studs 40' to an associated soft jaw 20 are essentially the same as such means in the embodiment shown in FIGS. 1-5 except that the ring 30' is located radially inwardly of such securing means. Such securing means comprises a bolt means, indicated generally as 41' and similar to bolt means 41 except that bolt means 41' is longer in length. The securing means also comprises an annular collar 42' which has a threaded bore 46 therein and which is identical in construction to collar 42 except that collar 42' is wider so as to position the ring 30' properly with respect to the soft jaw. 20.

The bolt means 41' comprises a long bolt 24' and a sleeve 25' adapted to have the shaft of the bolt 24' extend through its central hole 29'. The outer diameter of sleeve 24' fits within the central hole 44' of the annular collar 42'. Sleeve 25' has a reduced diameter portion 35 which is adapted to extend within counterbore 26 in soft jaw 20 and which is joined with the large diameter portion of sleeve 25' by a conical tapered portion 36 adapted to contact the chamfered outer end 37 of counterbore 26.

Figure 7:
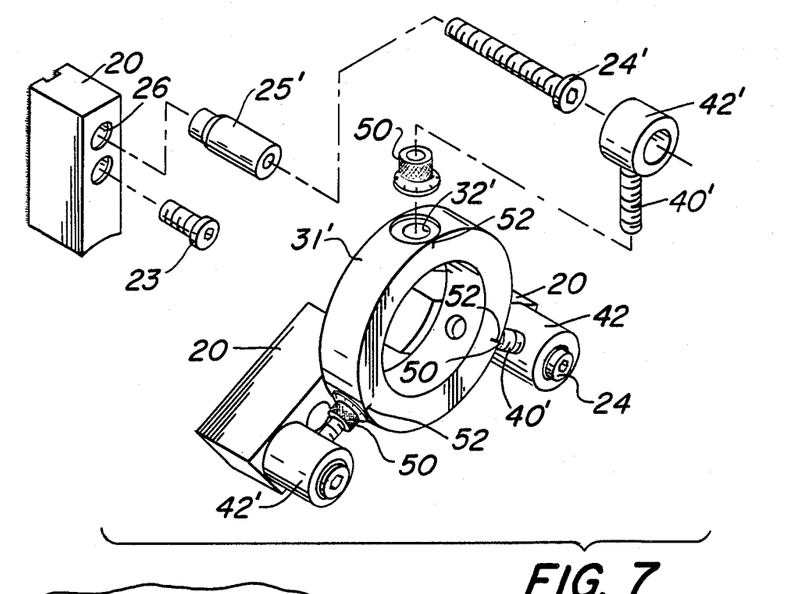
FIG. 7 is a perspective view of the embodiment shown in FIG. 6.
Figure 8:
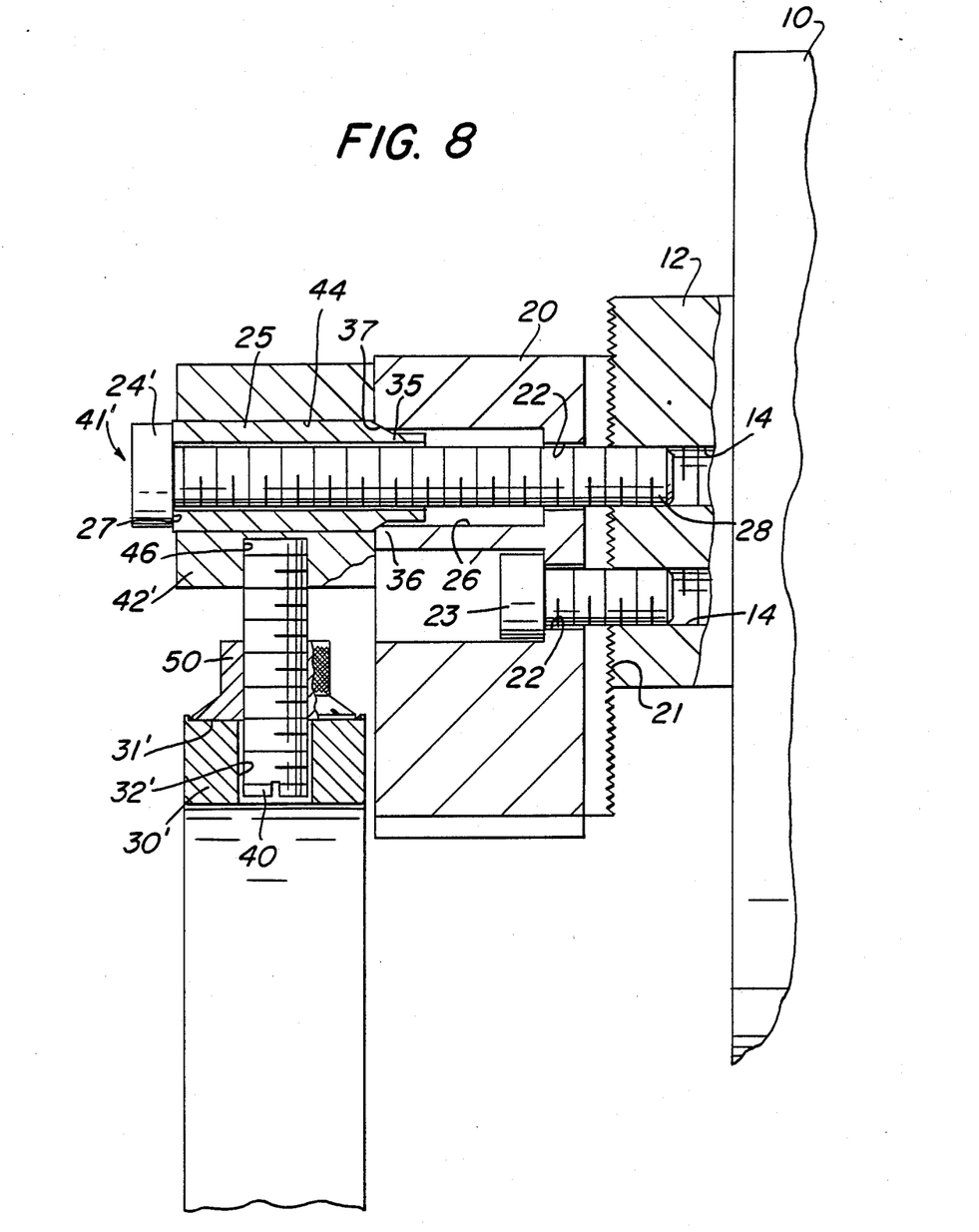
FIG. 8 is a fragmentary sectional view taken on line 8—8 of FIG. 6.
Figure 9:
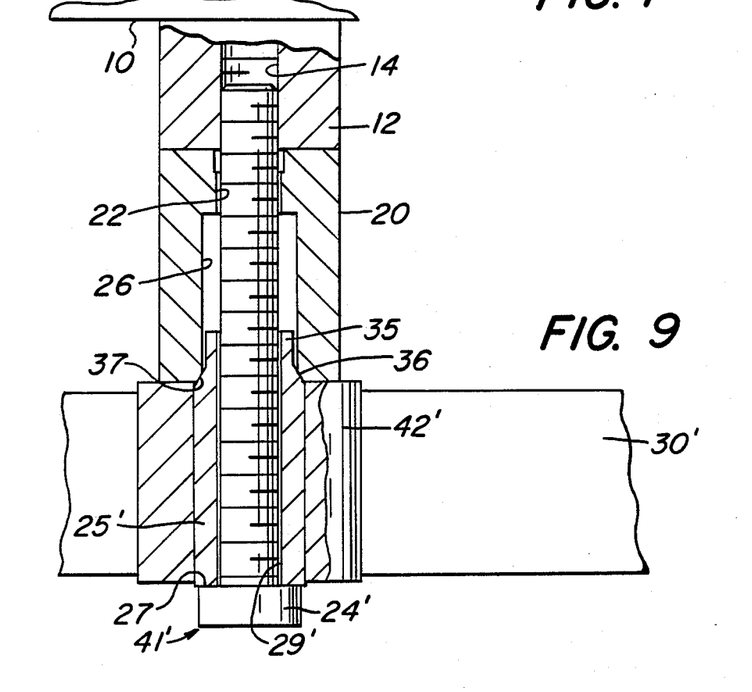
FIG. 9 is a fragmentary sectional view taken on line 9—9 of FIG. 6.

Each stud 40' is secured to an associated soft jaw 20 by assembling the parts in an arrangement as best shown in FIGS. 7 and 8. The bolt means 41' is secured in position as shown in FIG. 9 in the same manner as bolt means 41 to secure the soft jaw 20 onto hard jaw 12 in cooperation with bolt 23.

After each of the three bolt means 41' has been mounted to secure a soft jaw 20 and hard jaw 12 together, the ring 30' and the three studs 40' are positioned as shown in FIG. 6 with the three studs 40' engaged in their associated collars 42' and with the nuts 50 threaded on the portion of studs 40' extending radially outwardly of the outer surface of the ring 30'. As will be apparent by comparison of FIGS. 6-9 with the embodiment shown in FIGS. 1-5, the mounting arrangement is essentially the same except that the nuts 50 are pushed against the outer surface of ring 30' when the soft jaws 20 are moved radially inwardly by the operation of the chuck as was described above. Also, as with the embodiment of FIGS. 1-5, in the assembled condition of the jaw locking means shown in FIGS. 6-9, the studs 40' extend on an axis parallel to and spaced apart from the axis of radial movement of their associated soft jaws 20 and provide a threaded portion projecting radially from the outer surface 31' of the ring 30' whereat the nuts 50 are mounted. In the same manner as the embodiment of FIGS. 1-5, the nuts 50 of the embodiment of FIGS. 6-9 are adjustable along the length of the studs 40' to position, or limit the radial movement of, the soft jaws 20 so as to locate said soft jaws 20 at a desired position for the machining of the workpiece engaging surfaces of said soft jaws 20 as described above.

There are provided three annular disks 60 having a circular scale formed on the outer surface thereof in the same manner as described above with respect to the embodiment of FIGS. 1-5.

It will also be apparent that the use of the jaw locking means shown in FIGS. 6-9 is essentially the same as that described above with respect to the embodiment shown in FIGS. 1-5. The only essential difference is that in the operation of the embodiment shown in FIGS. 6-9, the nuts 50 are pushed against the outer surface of the ring 30' instead of being pulled thereagainst by the operation of the softs jaws 20.

What is claimed is:

1. For use with a chuck, such as a lathe chuck or the like, having a plurality of hard jaws guided for sliding movement toward and away from a chuck center and radially to the chuck axis by the jaw setting means of the lathe or the like, and a soft jaw secured on top of each of said hard jaws for conjoint movement therewith as a unit radially to the chuck axis, jaw positioning means for locking each soft jaw at a desired position for the machining of the workpiece engaging surface thereof comprising:

a ring means adapted to be arranged with portions in the proximity of the soft jaws, said ring means having radially extending holes, a plurality of studs, one stud associated with each soft jaw, means for securing each of said studs to an associated soft jaw and the hard jaw therebeneath with each stud extending through a radial hole in said ring means to provide a threaded portion projecting radially outwardly from the outer surface of said ring means and with each stud extending on a radial axis parallel to and spaced apart from the axis of radial movement of the associated soft jaw, and a plurality of nut means, one of said nut means being threadedly engaged on each of said studs at the outwardly projecting portion thereof, said nut means being adjustable radially along the threaded portion of said studs to a position to limit the radial inward movement of said soft jaws to lock said soft jaws at a desired position for the machining of said workpiece engaging surfaces of said soft jaws.

2. For use with a chuck, such as a lathe chuck or the like, having a plurality of hard jaws guided for sliding movement toward and away from a chuck center and radially to the chuck axis by the jaw setting means of the lathe or the like, and a soft jaw secured on top of each of said hard jaws for conjoint movement therewith as a unit radially to the chuck axis, jaw positioning means for locking each soft jaw at a desired position for the machining of the workpiece engaging surface thereof comprising:

a ring means adapted to be arranged with portions in the proximity of the soft jaws, said ring means having radially extending holes, a plurality of studs, one stud associated with each soft jaw, means for securing each of said studs to an associated soft jaw with each stud extending through a radial hole in said ring means to provide a threaded portion projecting radially outwardly from the outer surface of said ring means and with each stud extending on an axis parallel to and spaced apart from the axis of radial movement of the associated soft jaw, and a plurality of nut means, one of said nut means being threadedly engaged on each of said studs at the outwardly projecting portion thereof, said nut means being adjustable radially along the threaded portion of said studs to a position to limit the radial inward movement of said soft jaws to lock said soft jaws at a desired position for the machining of said workpiece engaging surfaces of said soft jaws, said means securing each of said studs to an associated soft jaw comprising a bolt means having a first portion adapted to be received in a counterbore in an associated soft jaw and to extend outwardly therefrom and a threaded portion adapted to be threadedly engaged with a hard jaw for securing said soft jaw to said hard jaw for the conjoint movement thereof, said associated stub being engagable with said first portion of said bolt means at a location outwardly of said soft jaw.

3. The combination according to claim 2 wherein said bolt means comprises a bolt having a bolthead providing a shoulder and a shaft extending from said shoulder, and a sleeve adapted to be positioned within the counterbore of said soft jaw, said bolthead being adapted to contact the outer end of said sleeve at said shoulder thereof, said sleeve having a shoulder portion adapted to contact said soft jaw at a portion of said counterbore thereof.

4. The combination according to claim 3 wherein said means securing each of said studs to an associated soft jaw includes a collar having a central bore adapted to fit onto the outer surface of said sleeve, said collar having a threaded bore therein adapted to be threadedly engaged by a threaded end portion of said studs.

5. The combination according to claim 3 wherein said shoulder portion of said sleeve comprises an inwardly tapered conical portion adapted to contact the outer end of said counterbore of said soft jaw so as to function as a centering device for said bolt means within said counterbore.

6. The combination according to claim 4 wherein said shoulder portion of said sleeve comprises an inwardly tapered conical portion adapted to contact the outer end of said counterbore of said soft jaw so as to function as a centering device for said bolt means within said counterbore.

7. The combination according to claim 1 wherein said portions of said ring means proximate said soft jaws are radially outwardly of said means for securing said studs to an associated soft jaw.

8. For use with a chuck, such as a lathe chuck or the like, having a plurality of hard jaws guided for sliding movement toward and away from a chuck center and radially to the chuck axis by the jaw setting means of the lathe or the like, and a soft jaw secured on top of each of said hard jaws for conjoint movement therewith as a unit radially to the chuck axis, jaw positioning means for locking each soft jaw at a desired position for the machining of the workpiece engaging surface thereof comprising:

a ring means adapted to be arranged with portions in the proximity of the soft jaws, said ring means having radially extending holes, a plurality of studs, one stud associated with each soft jaw, means for securing each of said studs to an associated soft jaw with each stud extending through a radial hole in said ring means to provide a threaded portion projecting radially outwardly from the outer surface of said ring means and with each stud extending on an axis parallel to and spaced apart from the axis of radial movement of the associated soft jaw, and a plurality of nut means, one of said nut means being threadedly engaged on each of said studs at the outwardly projecting portion thereof, said nut means being adjustable radially along the threaded portion of said studs to a position to limit the radial inward movement of said soft jaws to lock said soft jaws at a desired position for the machining of said workpiece engaging surfaces of said soft jaws, said portions of said ring means proximate said soft jaws being radially inwardly of said means for securing said studs to an associated soft jaw.

9. The combination according to claim 4 wherein said portions of said ring means proximate said soft jaws are radially outwardly of said means for securing said studs to an associated soft jaw, each of said studs extending radially outwardly from the threaded end thereof engaged with said collar to extend through a radial hole in said ring for engagement with a nut means on the exterior of said ring.

10. The combination according to claim 4 wherein said portions of said ring means proximate said soft jaw are radially inwardly of said means for securing said studs to an associated soft jaw, each of said studs extending radially inwardly from the threaded end thereof engaged with said collar to extend into a radial hole in said ring, a nut means being threaded onto said studs for contact with the outer surface of said ring means.

11. The combination according to claim 5 wherein said outer end of said counterbore has a conical configuration mating with said conical portion of said shoulder portion of said sleeve.

12. The combination according to claim 6 wherein said outer end of said counterbore has a conical configuration mating with said conical portion of said shoulder portion of said sleeve.

* * * * *